Figure 1:
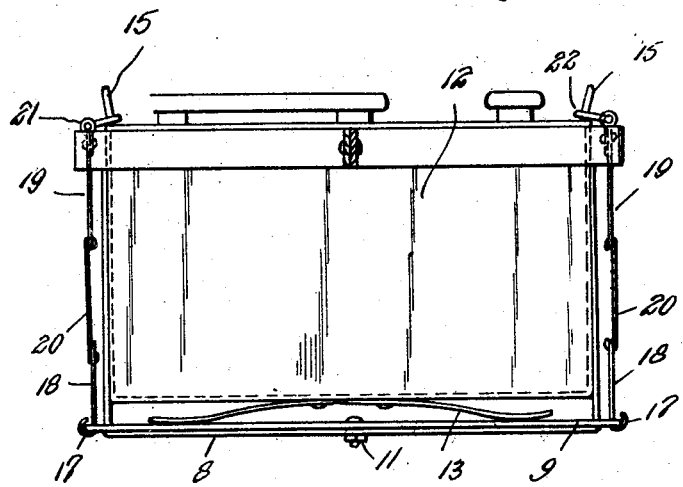

June 23, 1925.

L. J. BOHANNON 1,542,821

SUPPORT FOR VEHICLE BATTERIES

Filed May 19, 1923   2 Sheets-Sheet 1

L. J. Bohannon,
Inventor

Witnesses:

Attorney

June 23, 1925.  
L. J. BOHANNON  
1,542,821  
SUPPORT FOR VEHICLE BATTERIES  
Filed May 19, 1923  
2 Sheets-Sheet 2
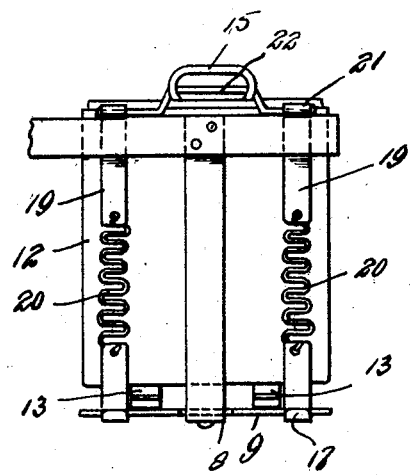
Fig. 3.
Fig. 4.
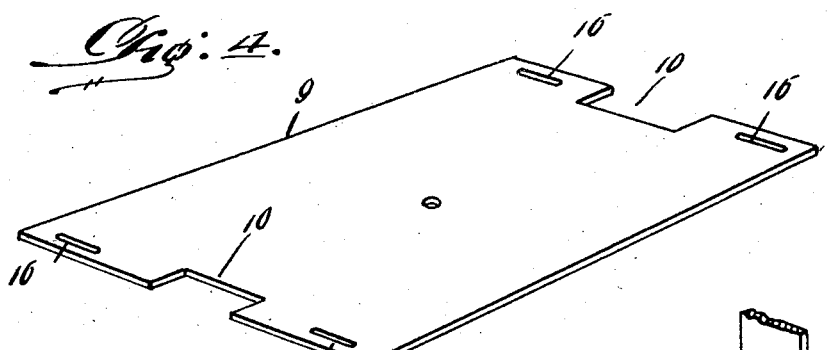
Fig. 6.
Fig. 5.
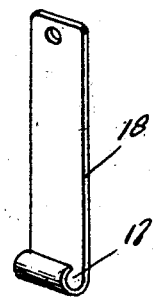
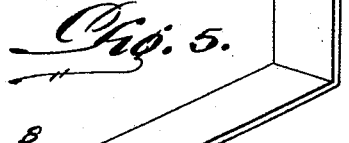
L. J. Bohannon  
Inventor.
Witnesses:

Patented June 23, 1925.

1,542,821

UNITED STATES PATENT OFFICE.

LLOYD J. BOHANNON, OF KANSAS CITY, MISSOURI.

SUPPORT FOR VEHICLE BATTERIES.

Application filed May 19, 1923. Serial No. 640,195.

*To all whom it may concern:*

Be it known that I, LLOYD J. BOHANNON, a citizen of the United States, residing at Kansas City, in the county of Jackson and State of Missouri, have invented certain new and useful Improvements in Supports for Vehicle Batteries, of which the following is a specification.

In carrying out the present invention, it is my purpose to provide a support for the batteries of motor vehicles, wherein the life of the battery will be materially increased, due to the fact that the same will not be subjected to the usual jars and shocks, for the reason that my present support is of a resilient character, which will consequently permit of a cushioning action between the batteries and the usual type of support for batteries, it being herein well to note that my improved support is adapted to be associated with the conventional type support now found upon practically all motor vehicles.

The primary object of this invention is to provide a support for batteries that may be associated with the usual type support in a simple and expeditious manner and when so associated therewith, will provide a cushion support for the batteries and prevent the rattling of the same and the contacting of the end walls of the battery with the usual hanger strap of a conventional type of support.

The nature and advantages of the invention will be better understood when the following detailed description is read in connection with the accompanying drawings, the invention residing in the construction, combination, and arrangements of parts as claimed.

In the drawings forming part of this application, like numerals of reference indicate similar parts in the several views, and wherein:—

Figure 1—is a side elevation of my improved support shown as associated with a conventional type support, and having a battery associated therewith.

Figure 2:
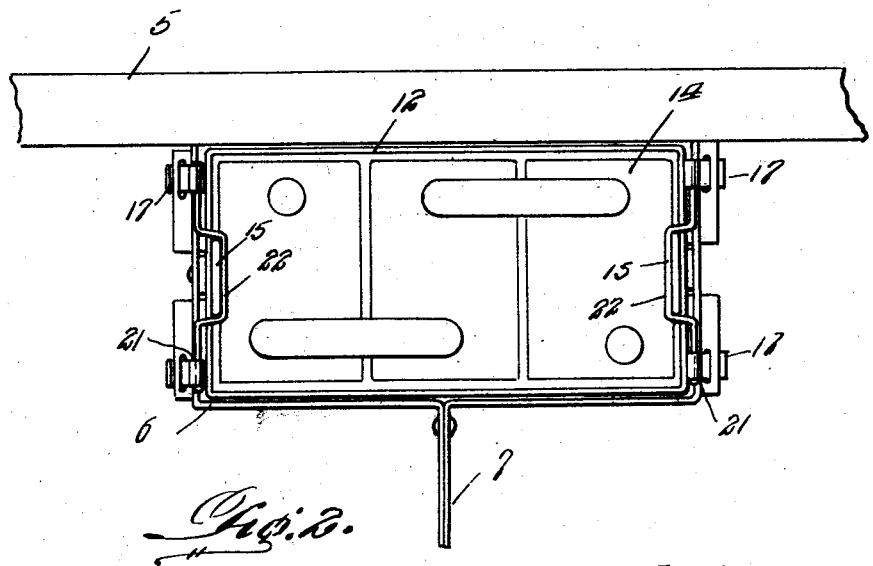

Figure 2—is a top plan view thereof.

Figure 3—is an end elevation.

Figure 4—is a perspective of the battery supporting plate of my invention.

Figure 5—is a fragmentary perspective of the supporting strap of a wellknown type of battery support, and Figure 6—is a perspective of one element comprised in my invention.

Having particular reference to the drawings, 5 designates one of the chassis bars of a motor vehicle, 6, the usual yoke of a well-known type battery support, 7, the cross bar of this type of support that extends across the vehicle, and is secured to the opposite chassis bars, and 8 the usual pendent U-shaped strap element.

My invention constitutes the provision of a rectangular shape plate 9, that is provided at its opposite ends with cut out portions 10, through which engage the vertical legs of the said U-shaped straps 8, this plate being secured to the strap 8 through the medium of a bolt and nut connection 11, it being of course understood in this connection, that the plate as well as the longitudinal portion of the strap 8 is provided with an opening for permitting of the passage of said bolt therethrough.

Slidable within said strap 8 is a metallic battery box 12, that has secured to its bottom wall through the medium of rivets or the like a relatively long flat-like spring 13, the ends of which are bent downwardly and engage the top surface of said plate 9, for thereby providing a cushion between the box and said plate.

This box 12 is adapted for receiving the usual battery 14, provided at its opposite ends with bail-shaped handles 15. The opposite ends of the plate 9 are provided with pairs of cross slits 16, the slits of each pair being upon the opposite sides of the cut out portions 10 at opposite ends of the plate. In engagement with each of these slits 16 are the curled or hooked ends 17 of flat-like links 18, Figure 6, which extend upwardly, and are in turn secured to other links 19, through the medium of flat-like springs 20. The upper ends of the last mentioned links are formed with eyes 21, the eyes upon each side of the support adapted for the reception of the opposite ends of bails 22, which are loosely disposed within said eyes and are adapted to be swung over the bail-like handles 15 of the battery 14, when the same is positioned within the box 12 as per Figures 1, 2 and 3.

In view of the above description, it will be at once seen that when the battery is positioned within the box 12 and the bails 21, 22 pulled upwardly and then swung over the handles 15 of the battery, that the same will be effectively coupled within the support for thereby overcoming the shaking and jarring of the battery and a consequent disruption of the same.

Numerous advantages of a support of this character will be readily appreciated by those skilled in the art, and even though I have herein shown and described the most preferred embodiment of my invention with which I am now familiar, it is nevertheless to be understood that minor changes may be made therein, without departing from the spirit and scope of the invention as claimed.

Having thus described my invention, what I claim as new, and desire to secure by Letters-Patent, is:

A device for supporting vehicle bodies including a U-shaped strap, a plate fixed to the intermediate portion of the U-shaped strap and provided with recesses at its ends for receiving the sides of the U-shaped strap, a battery box, a bowed leaf spring having its intermediate portion fixed to the bottom of the battery box, so that its ends engage the plate, said plate provided with slits one on each side of each recess, links engaged in said slits, resilient members engaged with said links, and other links engaged with said resilient members, and means for engaging the latter mentioned links with the handles of a battery in said battery box.

In testimony whereof I affix my signature.

LLOYD J. BOHANNON.